No. 697,389. Patented Apr. 8, 1902.
J. P. BARNES.
PLOW.
(Application filed Aug. 15, 1901.)
(No Model.)
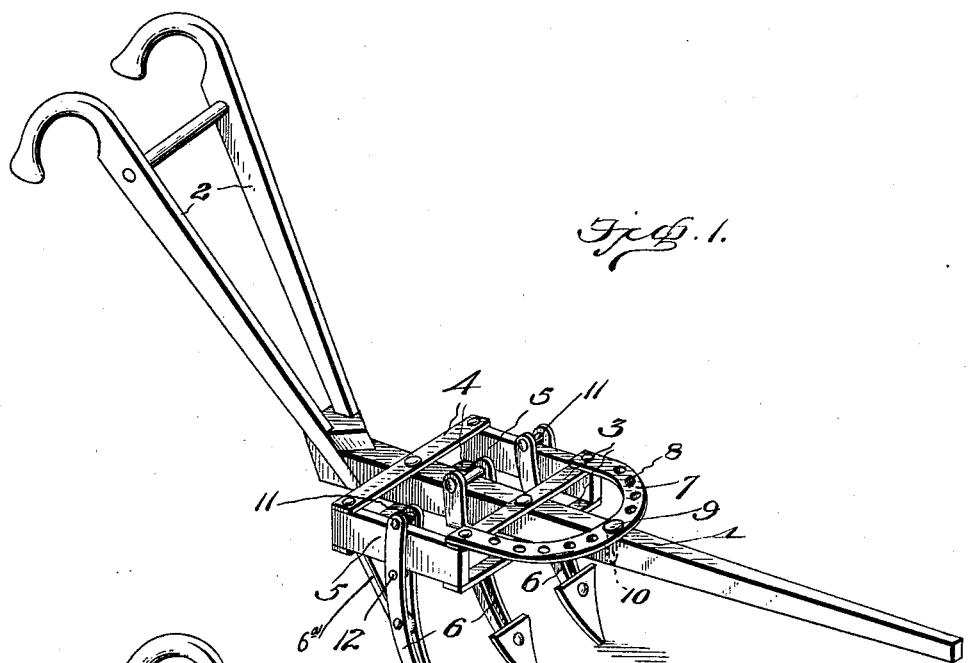
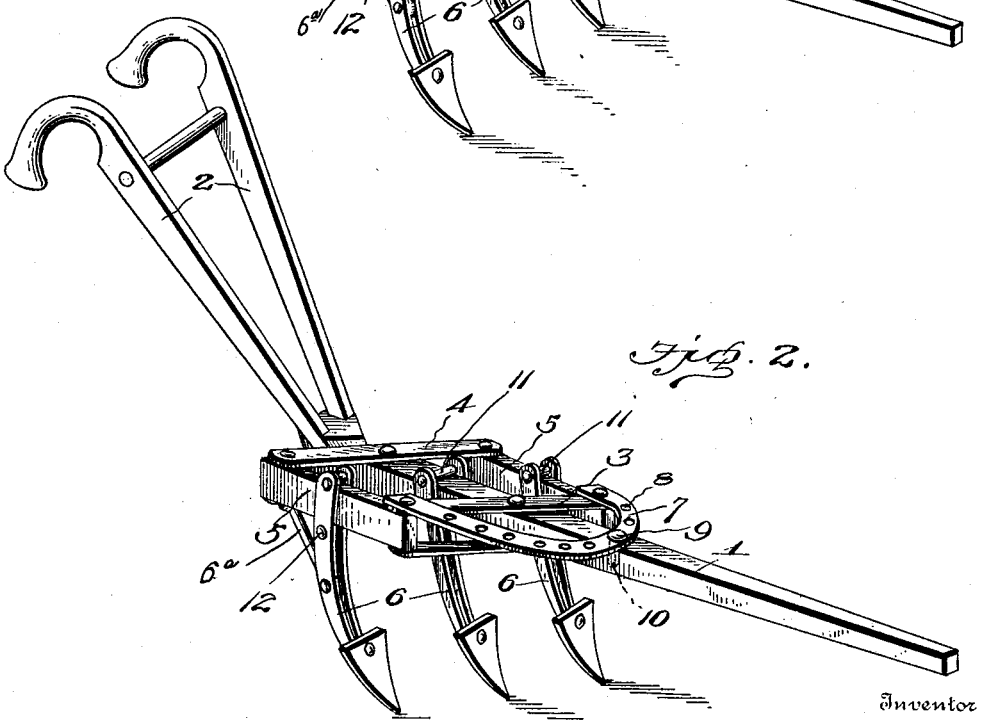
Inventor
J. P. Barnes
Witnesses
By H. B. Willson & Co.
Attorneys
THE NORRIS PETERS CO., PHOTO-LITHO., WASHINGTON, D. C.

UNITED STATES PATENT OFFICE.

JAMES PINKNEY BARNES, OF ELMA, MISSISSIPPI, ASSIGNOR OF ONE-HALF TO F. M. BENNETT AND J. L. HALL, OF EMMA, MISSISSIPPI.

PLOW.

SPECIFICATION forming part of Letters Patent No. 697,389, dated April 8, 1902.

Application filed August 15, 1901. Serial No. 72,164. (No model.)

*To all whom it may concern:*

Be it known that I, JAMES PINKNEY BARNES, a citizen of the United States, residing at Elma, in the county of Prentiss and State of Mississippi, have invented certain new and useful Improvements in Plows; and I do declare the following to be a full, clear, and exact description of the invention, such as will enable others skilled in the art to which it appertains to make and use the same.

The invention relates to plows.

The object of the invention is to provide a plow which shall be simple of construction, durable in use, comparatively inexpensive of production, and by means of which various combinations and changes may be easily and expeditiously made, so as to adapt the plow for the various kinds of work to be done on a farm, and at the same time the shovels retain a true parallelism with respect to each other and with respect to the plow-beam or line of draft, so that the plow-points, cultivator-shovels, or the tilling blade or implement used will always be in proper position with respect to the line of draft, and thereby more readily pass through the soil.

With these and other objects in view the invention consists of certain novel features of construction, combination, and arrangement of parts, which will be hereinafter more fully described, and particularly pointed out in the appended claim.

In the accompanying drawings, Figure 1 is a perspective view of my improved plow, showing the plow-standards arranged in a horizontal line at right angles to the beam and parallel with each other; and Fig. 2 is a similar view showing the plow-standards arranged in a line diagonal to the beam, with the cultivator-shovels parallel with the line of draft and with each other.

In the drawings, 1 denotes a plow-beam, and 2 the handles.

3 denotes the forward set of cross-bars pivoted to the plow-beam, and 4 the rear set of cross-bars pivoted to the plow-beam.

5 denotes links pivoted between the ends and connecting the front and rear set of cross-bars.

6 denotes standards, three being shown in the present instance, two being connected to the links and one being connected to the beam. Each plow-standard consists of a doubled piece of metal, the upper ends of which are spread apart and lie against the sides of the links and the sides of the plow-beam. Bolts 11 connect the ends of the plow-standards above the links and plow-beam and bolts 12 connect them below the links and plow-beam, whereby the tendency of the plow-beam to be forced downward when the plow strikes an obstruction or the tendency of the plow-beam to be forced upward are resisted, thus producing a strong construction.

6ª denotes braces connecting the plow-standards to the rear ends of the links.

7 denotes a segmental bar pivotally connected to the forward ends of the links and provided with a row of apertures 8, through any one of which is adapted to be inserted a pin 9, which enters a socket 10, formed in the beam and by means of which the cross-bars and links are held in adjusted position with respect to the plow-beam.

It will be observed by referring to the drawings that it makes no difference in which direction or position the plow-standards are adjusted they will always be parallel with each other with respect to the line of draft, and thereby maintain a true parallelism of the tilling tool or implement, such as the cultivator-shovels, with respect to the line of draft, thereby permitting of the more ready passage of the shovel, whereby the plow is rendered of lighter draft.

Various combinations may be effected by changing the different styles of tilling implements to the standards. This is obvious to those familiar with this class of invention, and a detail description is not thought necessary.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a plow, the combination with the plow-beam; of a forward set of cross-bars pivoted to the upper and lower sides thereof, a rear set of cross-bars also pivoted to the upper and lower sides of the plow-beam, links disposed between the ends of the forward set of cross-bars and the rear set of cross-bars and pivoted to said cross-bars, bifurcated plow-standards straddling said links and beam, braces connecting the outer standards to the rear ends of the links, bolts passed through the upper ends of said standards above the links and beam, bolts passed through said standards below the links and beam, a segmental perforated bar, and a pin adapted to pass through said perforations and lock the bar in adjustment with the beam, substantially as specified.

In testimony whereof I have hereunto set my hand in presence of two subscribing witnesses.

JAMES PINKNEY BARNES.

Witnesses:
JOHN W. GREEN,
C. C. HARRIS.